United States Patent [19]
Runnevik

[11] Patent Number: 5,335,536
[45] Date of Patent: Aug. 9, 1994

[54] LEAK DETECTION IN ROOFS

[75] Inventor: Lars Runnevik, Helsingborg, Sweden

[73] Assignee: AB Mataki, Sweden

[21] Appl. No.: 11,296

[22] Filed: Jan. 29, 1993

[30] Foreign Application Priority Data

Jan. 29, 1992 [SE] Sweden .................. 9200244-3

[51] Int. Cl.[5] .............................................. G01M 3/20
[52] U.S. Cl. ................................................. 73/40.7
[58] Field of Search ............................... 73/40.7, 40

[56] References Cited

U.S. PATENT DOCUMENTS

| | | | |
|---|---|---|---|
| 4,155,249 | 5/1979 | Scott | 73/40.7 |
| 4,198,856 | 4/1980 | Kaselaan et al. | 73/40.7 |
| 4,330,428 | 5/1982 | Clifford | 73/40.7 |
| 4,748,847 | 6/1988 | Sheahan | 73/40.7 |
| 5,107,698 | 4/1992 | Gilliam | 73/40.7 |
| 5,143,568 | 9/1992 | Sheahan | 73/40.7 X |

FOREIGN PATENT DOCUMENTS

| | | |
|---|---|---|
| 0269871 | 6/1988 | European Pat. Off. |
| 619711 | 10/1935 | Fed. Rep. of Germany . |
| 2400374 | 7/1975 | Fed. Rep. of Germany . |
| 250184 | 9/1987 | Fed. Rep. of Germany ...... 73/40 |

*Primary Examiner*—Hezron E. Williams
*Assistant Examiner*—Joseph W. Roskos
*Attorney, Agent, or Firm*—Ostrolenk, Faber, Gerb & Soffen

[57] ABSTRACT

The invention relates to a method for leak detection in roofs and interior and exterior floors covered or clad with sealing layer products and an apparatus for carrying out the method. Smoke gas is fed into and made to spread in a space between the sealing layer and the support on which the sealing layer rests. Any of the smoke gas penetrating in an outward direction through holes in the sealing layer is detected when it escapes from the holes on the outer side of the roof cover, whereby their locations can be determined. The apparatus for carrying out the method according to the invention comprises a device for generation of smoke gas, transport elements to move the smoke gas to the space where the smoke gas is made to spread, and a generator that creates an air flow for transport of the smoke gas.

14 Claims, 2 Drawing Sheets

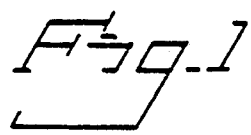
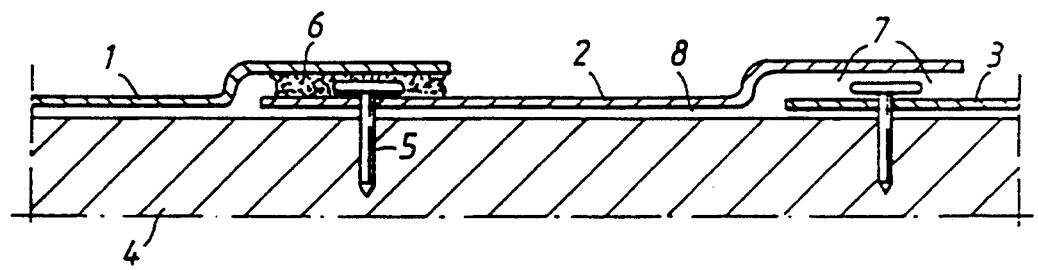
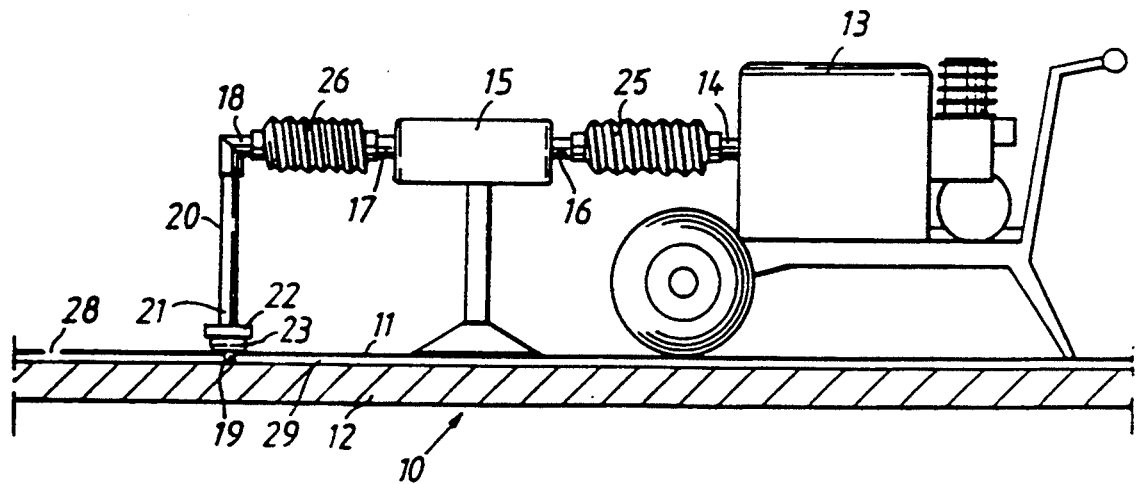

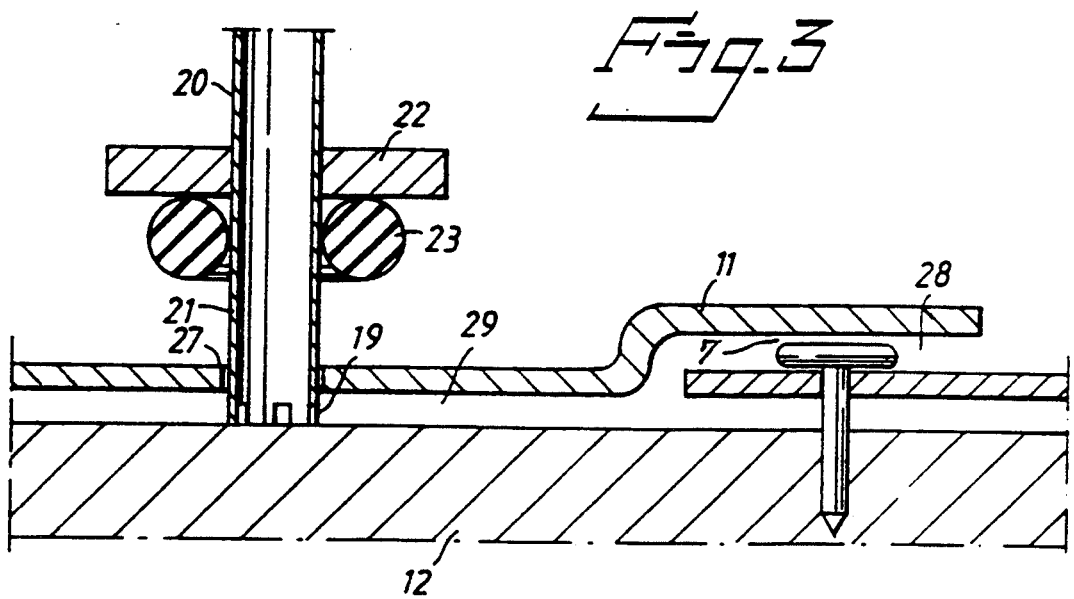
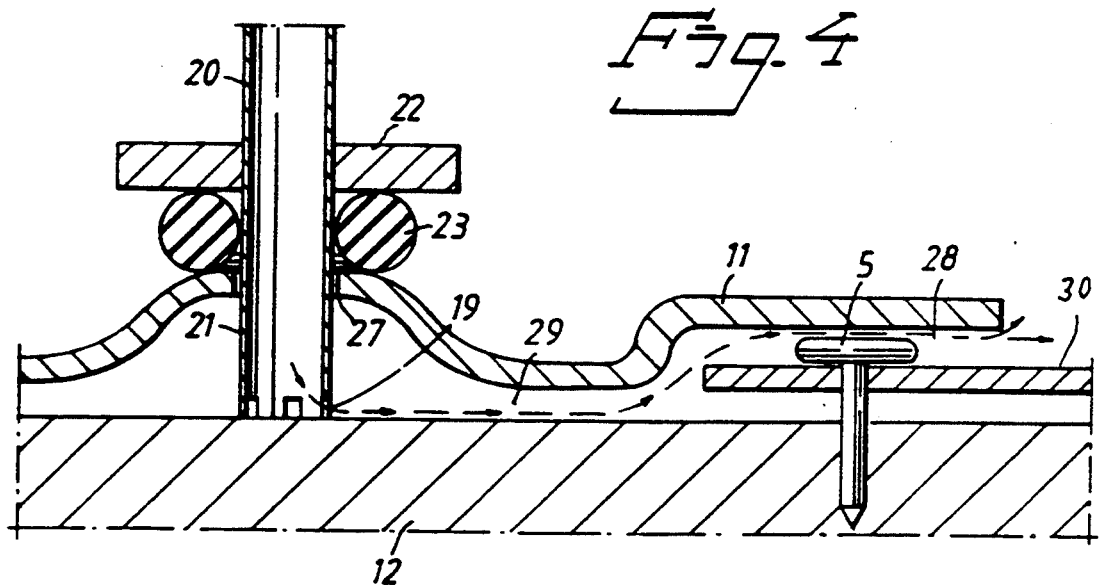
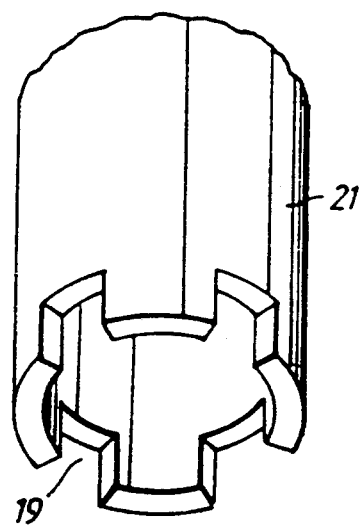

LEAK DETECTION IN ROOFS

The invention relates to a method for leak detection in roofs and floors clad with sealing layer products such as asphalted roofing-board forming sealed layers, and an apparatus for carrying out said method.

Sealing layer products, expecially various types of support materials treated with asphalt and the like, such as, for example, asphalted roofing-board or asphalt layers reinforced with felts of polymer materials, have been improved over the years, i.a. through improvement of their elongation properties. Thereby it has been possible to reduce the number of layers in a layered sealing. An example for a sealing layer material which is insensitive to changes in temperature, which shows good flexibility and adaptability at low temperatures and shape permanence at high temperatures is Uno-Tech TM (AB Mataki, Höganäs, Sweden), consisting of a rugged impregnated polyester felt, covered with polymer-modified asphalt. This and similar materials can be used for sealing with a single layer.

The main purpose with a sealing layer is to protect against penetration of atmospheric precipitation and melting water. Use of fewer layers and, particularly, of a single layer increases the need for the layer to be laid out expertly. The way the layer is being mounted and the quality of work are becoming more and more important for the impermeability of the end product.

Today single layer coverings are not uncommon, implying that only one layer is applied as sealing layer. The mounting usually is carried out with attachment devices adapted to the support, such as specially designed nails or screws, possibly in combination with washers or plugs. The seam is made by a single overlap which is glued, with, for example, a sealing glue based on asphalt, or is welded.

An error in connection with the laying-out of the sealing layer or excessive stress due to wind and weather conditions may result in the overlap seam yielding and, thus, leakage. Substantial damage may occur before leakage is detected. The need for a method for testing the impermeability of the seam and, thereby, of the roof is obvious.

Today visual inspection is the most common method for determining the impermeability of a roof; the method, of course, is highly subjective and requires profound expert knowledge.

In roofs with very low inclination or with no inclination at all water may be retained on top of the overlap and penetration may be detected on the inside of the roof, there being risk, however, for secondary damage. Another method is to measure humidity in the support. Furthermore each overlap may be checked with a leak detection apparatus based on the generation of ultrasound, the absorption of which by roof seams is measured (this method being comparatively slow and expensive), and by means of a so-called sucking box, a box-formed suction device which is placed over the area of suspected leakage. The vacuum created in the suction device reveals potential leakage with the aid of, for example, soap water. This method too is time-consuming and thus expensive.

The present invention discloses a new and safer method for leakage testing of roofs covered with sealing layer products and an apparatus for carrying out the method. By means of the method according to the invention large roof areas may be tested in a simple manner and simultaneously.

The present invention is characterized in that solid or liquid airborne microparticles, i.e., smoke or mist, are fed to a space adjacent to the sealing layer, to made spread within said space, and in that the smoke or mist penetrating outwardly through holes in the sealing layer is detected on the outside of the sealing layer whereby the precise location of holes is determined.

It is preferred to generate, preferably outside said space, a stream of air for supporting the feeding of the smoke or mist to said space and the spreading of the smoke or mist within said space.

According to the invention smoke or mist is generated, for example, by a smoke gas ampoule or a smoke generator or by a mist generator, and is fed to the space which in part is limited by the sealing layer, for example is blown against one side of the roof area covered by the sealing layer, preferably the inner side, and is made to spread. The smoke or mist prenetrating through holes in the sealing layer may be observed, i.a., by ocular inspection and the site of leakage thus can be easily determined and marked.

For smoke or smoke gas, which expressions denote the same thing, is preferably used an aerosol containing microscopic light-reflecting particles, for example, zinc oxide, titanium oxide or silica; the viscosity of the smoke gas is similar to that of pure gases and is much lower than that of liquids. Therefore the smoke gas penetrates through holes in the sealing layer much quicker than, for example, water. This particular feature advantageously distinguishes the test according to the invention from methods working with water or other liquids; in this respect the properties of a mist substantially coincide with those of the smoke gas. The mist may consist of microscopic water droplets formed by the cooling of humid air, for example by means of dry ice, or of microscopic water droplets at least in part consisting of a liquid with lower steam pressure than water, for example propylene glycol or mineral oil. The persistence and, thereby, the usefulness of mist containing higher boiling liquids of course is greater than of mist consisting of water particles. A proviso however is that the materials contained in the particles are environmentally and medically acceptable; in this connection mist based on prolylene glycol is particularly preferred.

It is also within the scope of the invention to carry out the test by generating the smoke or mist on the outside of the sealing layer and the observation on the inside. A two-fold test is also feasible, whereby smoke gas or mist to start with is generated at one side of the sealing layer, for example, the inside, and later at the other side, for example, the outside. By observation of the respective opposite side a two-fold control is obtained. This is of particular value when a humid zone on the inside of a roof covered with a sealing layer has to be correlated with the site of water penetration on the outside of the roof.

With the method according to the invention a roof area of substantial size, 100 $m^2$ and more, can be checked by one single test. This implies that a roof of a one-family home with a single coherent attic space that opens against the inner side of the roof in most cases can be tested by a single event of smoke gas generation.

It is also within the scope of the invention to automatically detect the smoke gas penetrating through the sealing layer, for example by detecting the reflection or absorption caused by the smoke gas of one or several IR or visible light beams sweeping parallel with and close to the roof surface.

The impermeability test can also be carried out during the mounting of a sealing layer by testing parts of the sealing layer as soon as they are finished. Normally the testing is carried out by making a hole in the sealing layer to provide communication with the space below the sealing layer, to make possible the feeding of smoke or mist in the space below the sealing layer from the outside. It is also possible to provide sealing layers with instructions for how to make holes or similar, or with passages that are provided with removable locks in order to let the impermeability testing be carried out at wish.

It is obvious that the method proposed according to the invention in addition to roofs may also be used for other surfaces covered with sealing layers such as walls, terraces, parking decks, etc. A precondition of course is that an empty space is present at the inside of the sealing cover into which smoke gas can be fed and where it can spread. The smoke gas may be fed to said empty space from outside or be generated within the space itself.

According to a preferred embodiment of the invention a slighty positive pressure, preferably of no more than 0.3 bar, can be provided in the space adjacent to the sealing layer where the smoke gas is made to spread, in order to accelerate the passage of smoke gas through holes in the sealing layer.

The apparatus for carrying out the method according to the invention comprises means for generation of smoke gas or mist, means for transport of smoke or mist to the space or volume adjacent to or bordering the sealing layer where the smoke or mist is made to spread, and means for generation of air flow for transport of the smoke or the mist.

It is preferred for the apparatus according to the invention to include means for generation of positive pressure.

The air flow may be generated by known means such as air pumps, ventilators, and the like. The positive pressure generating means may also include the means for generating air flow, such as compressors or ventilating fans of high capacity, and the like.

Further advantages with and distinguishing features of the invention are evident from the appended claims and from a preferred embodiment described in detail in the following by means of an attached drawing schematically illustrating in:

FIG. 1 a vertical section through a flat roof covered with a sealing layer of asphalted roofing-board in a direction transverse to the webs of asphalted roofing board, FIG. 2 a schematical side view of a leak test apparatus according to the invention, mounted for leakage testing on a roof covered with a sealing layer in which a hole for smoke gas injection is provided, FIG. 3 a partial view, enlarged, of the device in FIG. 2, before start of smoke gas injection, FIG. 4 a partial view, enlarged, of the device in FIG. 2, after start of smoke gas injection, and FIG. 5 part of a smoke injection probe according to the invention, in perspective side view from below.

In FIG. 1 a single sealing layer of asphalted roofing-board is mounted in form of overlapping webs 1, 2, 3 on a support 4 of a kind not identified in detail. Each web is fixed to the support 4 by means of attaching devices 5 along the border zone of the web which is overlapped by the nex web, the upper part of the attaching devices thereby always being covered by the sealing layer. In such way the sealing layer can be mounted on support consisting of mineral wool, gas (porous) concrete, matched boards with or without existing sealing layers that no longer properly operate, etc.; it is within the reach of the expert in the art to choose the proper attaching device adapted to the respective support.

The seams between different webs, such as shown for the seam between the first web 1 and second web 2, are sealed by an asphalt-based glue 6 arranged in-between them. They may also be sealed, e.g., by welding together the surface layer material of the webs, for example by application of hot air and pressure. The glue 6 in addition to its sealing function is intended as a means for keeping the edge of the overlying web 2 permanently attached to the underlying web 1. The larger part of the respective web 1, 2, 3 is resting loosely on the support 4. The sealing layer 1, 2, 3 and the support 4 thus form a gap, space or empty volume 8 in-between them.

However, leaks may arise through the stiffness of the sealing layer material or by the asphalt glue not being applied evenly or by the adhesive overlap attachment coming off. Such a leak is shown in FIG. 1 at the overlap area of the second 2 and third 3 web. The leak consists of an empty space 7 extending from the outside of the sealing layer to its inside, in a way communicating the outside with the space 8 formed in-between the sealing layer 1, 2, 3 and the support 4 as a result of the mounting operation. At the leak 7 water may easily penetrate; it is obvious that the leak 7 may be difficult to detect. During atmospheric precipitation water from the outside of the roof will flow through the leak 7 into the empty space 8 and accumulate there or disappear in the support 4 if the support is porous.

In FIG. 2 a preferred apparatus for leak detection according to the invention is shown mounted on a roof 10 to be inspected. The roof 10 has a structure similar to the roof in FIG. 1 but the scale of reproduction in FIG. 2 excludes the detailed rendering of web arrangement. Only the sealing layer 11 and the supporting layer 12 are shown.

The apparatus for leak detection according to one preferred embodiment of the invention comprises a commercially available electrically powered compressor 13 for air flow generation provided with an air outlet opening 14, an "Auer" (Germany) smoke gas ampoule 15 provided with air inlet and outlet openings 16, 17, of a type used for, e.g. detection of air circulation in buildings, and a smoke gas injection probe 20 with inlet and outlet openings 18, 19.

The smoke gas injection probe 20 comprises a preferably straight tube element 21 with a smoke inlet opening 18 at its one end and a smoke gas injection opening 19 at its other end. Between the ends of the smoke gas injection probe 20 is arranged a broad annular flange 22 for sealingly limiting the probe insertion length, and a soft resilient rubber ring 21 abutting against the surface of the annular flange 22 facing in direction of the outlet opening 19 and surrounding the probe 20. For variably setting the predetermined insertion length the annular flange 22 may be arranged displaceably on the tube element 21 of the smoke injection probe 20. The rim of the smoke gas injection opening 19 is, as shown in FIG. 5, dented; it may also be provided with incisions or slits, which facilitates smoke or mist injection and its spreading within the space 29, which functionally and construction-wise corresponds to the space 8 in FIG. 1. Instead of said incisions or slits radial through holes may be arranged in the tube element 21 near its injection opening 19. The indented part of the tube element 21 including the injection opening 19 has the function of a mouth piece and may be designed as a separate detachable end portion of the tube element 21.

Via its air outlet opening 14, the compressor 13 is connected to one end of a first flexible tube 25, the other end of which is coupled to the air inlet opening 16 of the smoke gas ampoule 15.

The smoke gas outlet opening 17 of the smoke gas ampoule 15 and the smoke gas inlet opening 18 of the smoke gas injection probe 20 are similarly connected by means of a second flexible tube 26.

When carrying out the leak detection method according to the invention a hole 27 is made in the sealing layer to be tested with, for example, a drill. The hole 27 is made in such way that it provides communication with the space 29 between the sealing layer 11 and the support 12. The diameter of the hole 27 is selected to be somewhat but not much larger than the diameter of the tube element 21 of probe 20.

The straight part of the tube element 21 situated between the annular flange 22 and the injection opening 19 is inserted into the opening 27. If the support 12 is soft and/or the space 29 comparatively deep at the opening 27, that is, has substantial extension below the opening 27 in a direction away from it, the probe 20 is inserted with its injection opening 19 until the rubber ring 23 abuts the sealing layer 11 and the probe 20 rests on the sealing ring 23 and the flange 22. If the extension of the space 29 below the opening 27 and in a direction away from the opening is small, the sealing layer 11 will dynamically seal against the flange 22 and the rubber ring 23 soon after the start of smoke gas injection, as described later on.

Connection of the separate parts of the apparatus according to the invention for leak detection described above may be made before or after the insertion of the injection probe 20 into the hole 27. Since the seal of the smoke ampoule 15 should not be broken earlier than necessary it might be advantageous to activate and couple the smoke ampoule 15 as the last of the individual parts to be connected.

After start of the compressor 13 air from its compressed air container is blown through the first connecting tube 25 into the smoke ampoule and from there carries with it the smoke particles for transport through the second connecting tube 26 to the smoke gas injection probe 20. The smoke gas leaves the probe 20 via the injection opening 19 and spreads within the space 29 which it may somewhat expand through its slight positive pressure and the relative light area weight of the sealing layer, such as being shown in FIGS. 3 and 4. The sealing layer 11 will rise from its starting position (FIG. 3) until its portion surrounding the hole 27 abuts sealingly against the rubber ring 23 at the annular flange 22 (FIG. 4). The smoke gas will proceed to spread within space 29 and sooner or later penetrate through the holes in the sealing layer, such as hole 28, to the outside of the roof. There the smoke can be observed and the region of hole 28 from which is emerges being indicated by making a mark at the location indicated by reference numeral 30 with, for example, chalk for later sealing.

Also shown in FIG. 4 is the path of smoke gas in leak detection. The arrows mark the path of the smoke gas from the injection opening 19 through the space 29 under the sealing layer 11 and further through a hollow space 28 communicating with the outside at a critical position for sealing a roof covered with asphalted roofing board at the overlap of two webs to the outside of sealing layer 11.

Testing of a normal roof with a single coherent space below the roof can be carried out within half an hour. After removal of the probe 20 the opening 27 in the sealing layer is closed with, for example, a sealing plug which can be removed if a new test is to be carried out.

The expert will preferably select weather conditions that are the most suitable for testing., i.e., avoid rainy weather or strong winds, if possible.

Instead of a smoke gas generator leak detection according to the invention also may be carried out with an apparatus producing mist, i.a. by means of a ZR41 smoke/mist generator (JEM Smoke Machine Co, Ltd., Spilby, GB) which produces smoke-like water/propylene glycol-based mist. This smoke/mist generator has an integrated pump and is directly coupled to the probe 20. For the rest, leak detection with the mist-producing apparatus is carried out in a way corresponding to that when using a smoke gas ampoule as smoke source.

I claim:

1. A method for detection of leaks in roofs and exterior and interior floors clad with single seam sealing layer products forming a sealing layer having an inner side and an outer side, the inner side facing a support that is being sealed by the sealing layer, said method comprising:

feeding smoke or mist into a space bordering to the inner side of the sealing layer to spread within said space, detecting, at the outer side of the sealing layer, smoke or mist penetrating outwardly through holes in the sealing layer to determine the location of the holes.

2. A method for detection of leaks in roofs or exterior and interior floors clad with single seam sealing layer products forming a sealing layer, the latter being on a support, the method comprising:

generating smoke or mist, generating a stream of air, mixing said smoke or mist with said stream of air, thereby forming an airstream containing smoke or mist particles, feeding the airstream containing mist or smoke particles into a space adjacent a side of the sealing layer that faces said support to spread within said space, detecting, at the other side of the sealing layer, smoke or mist particles penetrating from said one side of the sealing layer through holes in the sealing layer and escaping from said holes, thereby determining the location of the holes.

3. The method of claim 2, wherein the airstream containing smoke or mist particles has a positive pressure of up to and including 0.3 bar.

4. The method of claim 2, wherein the smoke is generated by a smoke generator.

5. The method of claims 3, wherein the air stream is generated by an air compressor or rotating air-feed means including ventilators and fans.

6. A method for detection of leaks in roofs clad with single seam sealing layer products forming a sealing layer, the latter being on a support, said method comprising:

generating smoke or mist, generating a stream of air, mixing said smoke or mist with said stream of air, thereby forming an airstream containing smoke or mist particles, feeding from outside of the building protected by the sealing layer said airstream containing mist or smoke particles through an opening in the sealing layer into a volume adjacent to an inner side of the sealing layer facing said support, to spread within said volume, detecting at an exposed outer side of the sealing layer, smoke or mist particles passing through holes in the sealing layer from its inner side to its outer side, thereby determining the location of the holes.

7. A method for detection of leaks in roofs clad with sealing layer products forming a sealing layer, comprising generating, outside of a roof, a stream of air having a positive pressure and containing smoke or mist particles, feeding said stream of air to an injection probe comprising sealing means for temporary sealing against the sealing layer in an area bordering a through opening in the sealing layer, inserting an end portion of said injection probe having a mouthpiece into said through opening, injecting said stream of air containing smoke or mist particles through said mouthpiece into a volume adjacent to the sealing layer, thereby expanding said volume and making the sealing layer to sealingly abut said sealing means, detecting, at their exit, smoke particles having passed from said volume through holes in the sealing layer.

8. An apparatus for leak detection in roofs or floors clad with single seam sealing layer products forming a sealing layer, said sealing layer being on a support, said apparatus comprising:

means for generation of smoke or mist, means for generation of an air flow, means for mixing said smoke or mist with said air flow, means for transport of said air flow admixed with smoke or mist to a space bordering one side of said sealing layer that faces said support, means for detection, at the other side of the sealing layer, of smoke or mist particles passing through holes in the sealing layer from said one side to said other side.

9. An apparatus for leak detection in roofs clad with single layer sealing layer products forming a sealing layer, said apparatus comprising:

means for generation of smoke or mist, means for generation of an air flow, means for mixing said smoke or mist with said air flow, means for injecting said air flow admixed with smoke or mist at one side of said sealing layer through an opening in the sealing layer into a space bordering said one said of said sealing layer, said one side of said sealing layer facing a support for said sealing layer, means for detection of smoke or mist particles passing through holes in the sealing layer other said opening to the opposite side of the sealing layer.

10. An apparatus for leak detection in roofs clad with sealing layer products forming a sealing layer, said layer being on a support, said apparatus comprising an air compressor, a smoke generator, and injection probe for injection smoke gas into a space bordering an inner surface of said sealing layer that faces said support, and means for detection of smoke particles passing outside of the sealing layer through holes in the sealing layer.

11. The apparatus of claim 10, wherein the means for detection of smoke particles are optical, including visual observation by a human person.

12. An apparatus for leak detection in roofs clad with sealing products, comprising an injection probe for injecting smoke gas or mist through an opening in a sealing layer into a space bordering the sealing layer, said probe comprising an injection tube provided at its one end with a mouthpiece and at a position intermediate between its one end and its other end with a flange surrounding the tube and having sealing means arranged adjacent to a side of the flange facing the mouthpiece, said sealing means being arranged for sealing abutment against the sealing layer and the flange during injection of smoke gas or mist through said opening.

13. The apparatus of claim 12, wherein the injection tube at its one end has at least one indentation, incision or slit extending in direction of the flange or holes.

14. The apparatus of claim 12, wherein the mouthpiece of the injection tube is provided with at least one radially extending through hole.

* * * * *